US012480229B2

(12) United States Patent
Vlasblom et al.

(10) Patent No.: US 12,480,229 B2
(45) Date of Patent: Nov. 25, 2025

(54) UHMWPE FIBER

(71) Applicant: Avient Protective Materials B.V., Geleen (NL)

(72) Inventors: Martin Pieter Vlasblom, Echt (NL); Pieter Gijsman, Echt (NL)

(73) Assignee: AVIENT PROTECTIVE MATERIALS B.V., Geleen (NL)

( * ) Notice: Subject to any disclaimer, the term of this patent is extended or adjusted under 35 U.S.C. 154(b) by 0 days.

(21) Appl. No.: 18/219,894

(22) Filed: Jul. 10, 2023

(65) Prior Publication Data

US 2023/0366128 A1  Nov. 16, 2023

Related U.S. Application Data

(63) Continuation of application No. 14/893,384, filed as application No. PCT/EP2014/060644 on May 23, 2014, now abandoned.

(30) Foreign Application Priority Data

May 23, 2013 (EP) ..................................... 13168985

(51) Int. Cl.
*D01F 6/04* (2006.01)
*B29C 48/05* (2019.01)
(Continued)

(52) U.S. Cl.
CPC ................ *D01F 6/04* (2013.01); *B29C 48/05* (2019.02); *C08K 5/3435* (2013.01); *C08L 23/06* (2013.01);
(Continued)

(58) Field of Classification Search
CPC ........... D01F 6/04; D01F 1/10; C08K 5/3435; C08K 5/005; C08L 23/06; C08L 79/04; B29C 48/05; B29C 48/87
See application file for complete search history.

(56) References Cited

U.S. PATENT DOCUMENTS 4,413,110 A   11/1983  Kavesh et al.
5,652,142 A    7/1997  Barker et al.
(Continued)

FOREIGN PATENT DOCUMENTS

CN   1039432       2/1990
CN   101688332     3/2010
(Continued)

OTHER PUBLICATIONS

International Search Report for PCT/EP2014/060644, mailed Jul. 22, 2014, 4 pages.
(Continued)

*Primary Examiner* — Mathieu D Vargot
(74) *Attorney, Agent, or Firm* — NIXON & VANDERHYE P.C.

(57) ABSTRACT

The invention relates to a creep optimized gel-spun fiber comprising a polyethylene fiber body obtained by spinning an UHMWPE comprising alkyl branches (AB) and having an elongational stress (ES), and a ratio $$\left(\frac{AB/1000C}{ES}\right)$$

of at least 0.2 mm²/N, wherein a stabilizer is present inside the fiber body, characterized in that the amount of said stabilizer is between 0.05 and 10 parts by weight based on 100 parts by weight of the amount of the PE forming said fiber body.

30 Claims, 2 Drawing Sheets

(51) Int. Cl.
    *C08K 5/3435*  (2006.01)
    *C08L 23/06*   (2006.01)
    *C08L 79/04*   (2006.01)
    *D01F 1/10*    (2006.01)
    *C08K 5/00*    (2006.01)
    *C08K 5/3492*  (2006.01)

(52) U.S. Cl.
    CPC ............. *C08L 79/04* (2013.01); *D01F 1/10* (2013.01); *C08K 5/005* (2013.01); *C08K 5/34926* (2013.01)

(56) References Cited

U.S. PATENT DOCUMENTS

| 9,534,066 B2    | 1/2017  | Boesten         |
| 2007/0154707 A1 | 7/2007  | Simmelink et al.|
| 2008/0305331 A1 | 12/2008 | Tam et al.      |
| 2010/0286728 A1 | 11/2010 | Simmelink       |
| 2012/0012363 A1 | 1/2012  | Cho et al.      |

FOREIGN PATENT DOCUMENTS

| EP | 0 205 960 | 12/1986 |
| EP | 0 213 208 | 3/1987  |
| EP | 0 343 863 | 11/1989 |
| EP | 0 200 547 | 7/1991  |
| EP | 0 472 114 | 4/1992  |
| EP | 1 699 954 | 7/2005  |
| EP | 2 481 847 | 8/2012  |
| JP | 4-9044    | 1/1992  |
| JP | 7-166413  | 6/1995  |
| JP | 1995-166413 | 6/1995 |
| JP | 2000-281840 | 10/2000 |
| JP | 2007-522351 | 8/2007 |
| JP | 2010-529319 | 8/2010 |
| JP | 2012-521632 | 9/2012 |
| WO | WO 01/73173 | 10/2001 |
| WO | WO 2004/033774 | 4/2004 |
| WO | WO 2005/066400 | 7/2005 |
| WO | WO 2005/066401 | 7/2005 |
| WO | WO 2006/040190 | 4/2006 |
| WO | WO 2008/131925 | 11/2008 |
| WO | WO 2009/043597 | 4/2009 |
| WO | WO 2009/043598 | 4/2009 |
| WO | WO 2009/056286 | 5/2009 |
| WO | WO 2009/124762 | 10/2009 |
| WO | WO 2011/018237 | 2/2011 |
| WO | WO 2012/139934 | 10/2012 |

OTHER PUBLICATIONS

Written Opinion of the ISA PCT/EP2014/060644, mailed Jul. 22, 2014, 5 pages.

Gugumus, "New trends in the stabilization of polyolefin fibers", *Ploymer Degradation and Stability,* vol. 44, No. 3, pp. 273-297.

Bracco et al., "Radiation-induced crosslinking of UHMWPE in the presence of co-agents: chemical and mechanical characterization", Polymer 46, 2005, pp. 10648-10657.

Vlasblom et al., "Predicting the Creep Lifetime of HMPE Mooring Rope Applications", IEEE, 2006, 10 pages.

CIBA® 944 data sheet, 1975.

UHMWPE FIBER

CROSS-REFERENCE TO RELATED APPLICATIONS

This application is a continuation of commonly owned copending U.S. Ser. No. 14/893,384 filed Nov. 23, 2015, (now abandoned), which is the U.S. national phase of International Application No. PCT/EP2014/060644 filed May 23, 2014, which designated the U.S. and claims priority to EP Patent Application No. 13168985.3 filed 23 May 2013, the entire contents of each of which are hereby incorporated by reference.

FIELD

This invention relates to a creep-optimized gel-spun fiber comprising a polyethylene fiber body obtained, a process for producing the same and various products such as ropes, nets, medical devices, fabrics, laminates, composite articles and ballistic-resistant articles containing said fibres.

BACKGROUND AND SUMMARY

During the last decades, many research projects focused on improving the creep properties of synthetic fibers, since such fibers are extremely suitable for a wide range of applications where lightweight and strength are driving factors. One example of synthetic fibers is UHMWPE fibers, which meet successfully the weight and strength requirements. The almost unmatched strength of UHMWPE fibers combined with ultraviolet resistance, chemical resistance, cut and abrasion resistance and other favorable properties are the reasons that these fibers found an almost immediate utilization in rope mooring, composite reinforcement, medical devices, cargo nets and the like.

UHMWPE fibers have however one drawback which acts as an impediment for their optimal utilization in long-term applications, this drawback being related to their creep behavior. It was observed that the ultimate failure mode of a system using UHMWPE fibers and in particular of those systems placed under a long-term load, is rupture or failure due to creep. Such systems and particularly those intended for long-term or ultralong-term use must therefore be over-designed to last for a large number of years, e.g. more than 10 years and in some cases more than even 30 years. Therefore, an immediate need was felt in the industry, i.e. the need for an UHMWPE fiber having an optimized creep behavior. Accordingly many research projects aiming to improving UHMWPE fibers focused on their creep behavior and almost all these projects focused solely on optimizing a creep rate thereof.

For example, WO 2009/043598 and WO 2009/043597 disclose UHMWPE fibers having a good combination of creep rate and tensile strength, e.g. a creep rate of at most $5 \times 10^{-7}$ sec$^{-1}$ as measured at 70° C. under a load of 600 MPa, and a tensile strength of at least 4 GPa.

More recently example for fibers with good creep behaviour and a process for producing thereof are known from WO2012139934; disclosing UHMWPE fibres having creep lifetime as high as 500 hours as measured at 70° C. under a load of 600 MPa and tensile strengths as high as 4.1 GPa.

Although the fibers known from the prior art have acceptable creep lifetime and/or creep rate, there remains a need to further optimize the long term creep properties, also called survivability.

An aim of the present invention may therefore be to provide an UHMWPE fiber having an optimized survivability. A further aim of the present invention may be to provide an UHMWPE fiber having an optimized survivability and also good tensile properties, e.g. tensile strength, tensile modulus and/or elongation at break. A yet further aim of the present invention may be to provide an UHMWPE fiber having an improved survivability when compared to the survivability of the existing UHMWPE fibers.

The invention provides a creep optimized gel-spun fiber comprising a polyethylene fiber body obtained by spinning an UHMWPE comprising alkyl branches (AB) and having an elongational stress (ES), and a ratio $$\left(\frac{AB/1000C}{ES}\right)$$

between the number of alkyl branches per thousand carbon atoms (AB/1000C) and the elongational stress (ES) of at least 0.2 N/mm², wherein a stabilizer is present inside the fiber body, characterized in that the amount of said stabilizer is between 0.05 and 10 parts by weight based on 100 parts by weight of the amount of the UHMWPE forming said fiber body.

DETAILED DESCRIPTION

Figure 1:
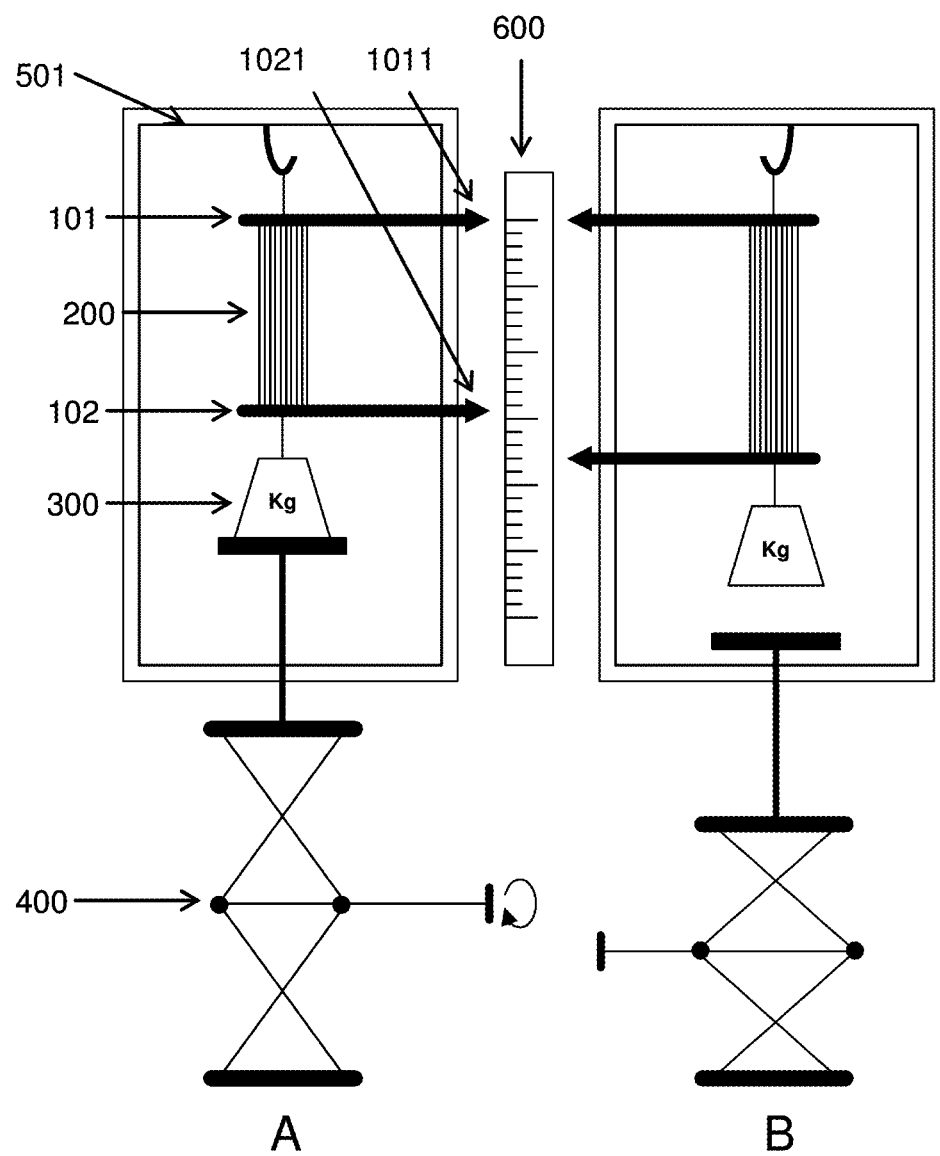
FIG. 1 shows a setup used for the determination of the creep lifetime of the UHMWPE fibers of the invention.

It was observed that by optimizing the creep lifetime of a fiber, its survivability under a long-term load may also be optimized. In particular it was observed that inventive UHMWPE fibers may be produced in accordance with the invention, said fibers having a creep lifetime never achieved hitherto by any existing UHMWPE fiber. It was also observed that due to its optimized creep properties the inventive UHMWPE fiber is useful in a variety of applications and in particular in those applications where a long- or an ultralong-term load is applied on said fibers, e.g. offshore oil production platform mooring. By ultralong-term load is herein understood a load that is applied on the inventive UHMWPE fibers for at least 5 years, more preferably at least 10 years, more preferably for at least 20 years, preferably under normal use conditions e.g. of humidity, temperature and load. For example, for offshore mooring, normal load conditions may be loads of at most 70% of the breaking load of the fibers or of the product containing said fibers such as ropes; and normal temperature conditions may be the temperature of the environment, e.g. of water at various depths or above water. The inventors also observed that the design of systems or devices intended for long-term and ultralong-term applications and comprising the inventive UHMWPE fibers, may be less complicated and laborious.

It has also been surprisingly discovered that incorporation of stabilizers and in particular UV stabilizers in the fiber body further optimizes the creep lifetime of the UHMWPE fibers. Moreover, said stabilizers optimally protect the fiber against degradation, while having an acceptable influence on the mechanical properties, e.g. tensile strength, thereof.

According to the invention, a stabilizer is present inside the fiber body. By stabilizer is herein understood a compound which contributes to the stabilization of one or more fiber properties, e.g. mechanical properties such as tensile strength, elongation at break and modulus but also other chemical or physical properties such as bio-degradability, UV resistance, thermo-oxidative stability and the like. By stabilization of a fiber property is herein meant that said compound contributes in maintaining that property within acceptable limits during a set period of time.

By fibre is herein understood an elongated body, e.g. a body having a length and transverse dimensions, wherein the length of the body is much greater than its transverse dimensions. The term fibre as used herein may also include various embodiments, e.g. a filament, a tape, a strip, a ribbon and a yarn. The fiber may also have regular or irregular cross-sections. The fiber may also have a continuous and/or a discontinuous length. Preferably, the fiber has a continuous length, such fiber being known in the art as a filament. Within the context of the invention, a yarn is understood to be an elongated body comprising a plurality of fibres.

Preferably, the stabilizer is present in an amount of at least 0.05, more preferably at least 0.075, even more preferably at least 0.1 parts by weight based on 100 parts by weight of the amount of the polyolefin polymer forming the fiber body. Preferably, said stabilizer's amount is at most 10, more preferably at most 8, even more preferably at most 6, yet even more preferably at most 5, most preferably at most 3 parts by weight based on 100 parts by weight of the amount of the polyethylene polymer forming the fiber body. In a preferred embodiment, the amount of stabilizers is between 0.05 and 5 parts by weight, more preferably 0.05 and 1 parts by weight based on 100 parts by weight of the amount of the polyethylene polymer forming the fiber body.

Preferred stabilizers suitable for the invention are hindered amine stabilizers (HAS). Although, HAS are known as stabilizers for polyethylene, it was hitherto impossible to incorporate them in a sufficient amount in fibers such that these stabilizers would effectively protect said fibers.

It was also surprisingly observed that HAS interfered to a lesser extent than other stabilizers with the gel-spinning process of making a gel-spun UHMWPE fiber. While when using various stabilizers in said process, the spinning parameters, e.g. spinning tension, drawing patterns, polymer concentration and type, etc., needed to be re-adjusted to accommodate for the addition of said stabilizers, it was observed that when using HAS, essentially the same spinning parameters as for a conventional gel-spinning process, i.e. without stabilizers, could have been used. In other words, essentially no re-adjustment of the spinning parameters is needed when using HAS.

The invention also relates to a gel-spun fiber comprising a PE polymer forming a fiber body, wherein a HAS is present inside the fiber body, wherein the amount of HAS is preferably at least 0.05 parts by weight based on 100 parts by weight of the amount of the PE polymer forming said fiber body. Preferably, the amount of HAS is at most 1.0 parts by weight based on 100 parts by weight of the amount of the polyolefin polymer forming said fiber body. The invention further relates to a yarn containing said fibers, the yarn having a titer of between 5 dtex and 400 dtex, more preferably between 10 dtex and 250 dtex, most preferably between 20 dtex and 150 dtex.

Preferred HAS compounds include those of the following general formulas or combinations thereof;

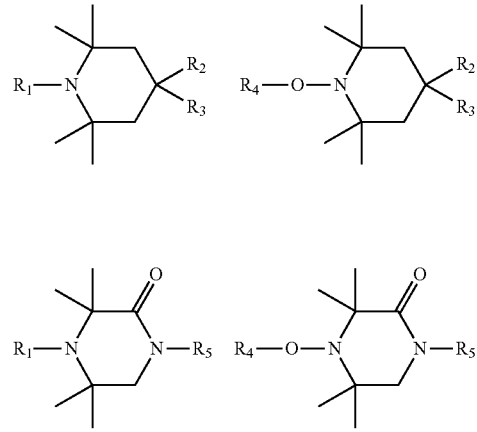

wherein $R_1$ up to and including $R_5$ are independent substituents; for example containing hydrogen, ether, ester, amine, amide, alkyl, alkenyl, alkynyl, aralkyl, cycloalkyl and/or aryl groups, which substituents may in turn contain functional groups, for example alcohols, ketones, anhydrides, imines, siloxanes, ethers, carboxyl groups, aldehydes, esters, amides, imides, amines, nitriles, ethers, urethanes and any combination thereof.

Preferably the HAS is a compound derived from a substituted piperidine compound, in particular any compound which is derived from an alkyl-substituted piperidyl, piperidinyl or piperazinone compound or a substituted alkoxypiperidinyl. Other suitable HAS are those that are derivatives of 2,2,6,6-tetramethyl piperidine.

Preferred specific examples of HAS include:

(1) Bis(2,2,6,6-tetramethyl-4-piperidyl)sebacate (2) Bis(1,2,2,6,6-pentamethyl-4-piperidyl)sebacate (3) Tetrakis(2,2,6,6-tetramethyl-4-piperidyl)-1,2,3,4-butanetetracaboxylate (4) 2,2,6,6-Tetramethyl-4-piperidyl benzoate (5) Bis(1,2,2,6,6-pentamethyl-4-piperidyl)-2-(3,5-t-butyl-4-hydroxybenzyl)-2-n-butylmalonate (6) 1,1-(1,2-Ethanediyl)bis(3,3,5,5-tetramethyl)piperazinone (7) (2,2,6,6-Tetramethyl-4-piperidyl/tridecyl)-1,2,3,4-butanetetracarboxylate (8) (1,2,2,6,6-Pentamethyl-4-piperidyl/tridecyl)-1,2,3,4-butanetetracaboxylate (9) {2,2,6,6-Tetramethyl-4-piperidyl/ß,ß,ß',ß'-tetramethyl-3,9-[2,4,8,10-tetraoxasprio(5,5)-undecane]diethyl}-1,2,3,4-butanetetracarboxylate

(10) {1,2,2,6,6-Pentamethyl-4-piperidyl/ß,ß,ß',ß'-tetramethyl-3,9-[2,4,8,10-tetraoxasprio(5,5)-undecane]diethyl}-1,2,3,4-butanetetracarboxylate

(11) N,N'-Bis(3-aminopropyl)ethylenediamine-2,4-bis-[N-butyl-N-(1,2,2,6,6-pentamethyl-4-piperidyl)amino]-6-chloro-1,3,5-triazine condensate

(12) [N-(2,2,6,6-tetramethyl-4-piperidyl)-2-methyl-2-(2,2,6,6-tetramethyl-4-piperidyl)imino]propionamide.

More preferred HAS are:

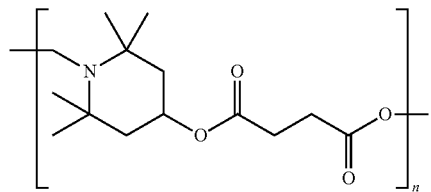

wherein n is preferably from 1 to 50. Such compound may be obtained by the reaction of dimethyl succinate with 4-hydroxy-2,2,6,6-tetramethyl-1-piperidine ethanol. Such compound is known as Dimethyl succinate polymer with 4-hydroxy-2,2,6,6-tetramethyl-1-piperidine ethanol;

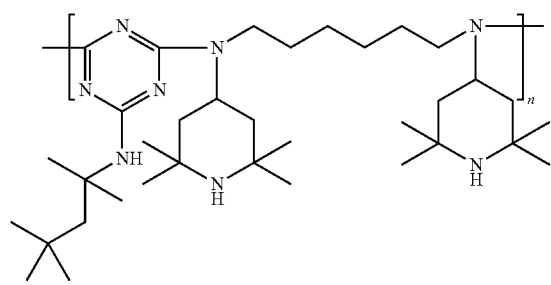

wherein n is preferably from 1 to 50. Such compound is known as Poly{[[6-[(1,1,3,3-tetramethylbutyl)amino]-s-triazine-2,4-diyl][(2,2,6,6-tetramethyl-4-piperidinyl)imino] hexamethylene [(2,2,6,6-tetramethyl-4-piperidinyl)imino]]};

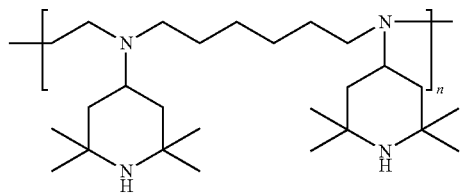

wherein n is preferably from 1 to 50. Such compound is known as Poly[[(2,2,6,6-tetramethyl-4-piperidinyl)imino]-1,2-ethanediyl[(2,2,6,6-tetramethyl-4-piperidinyl)imino]-1,6-hexanediyl;

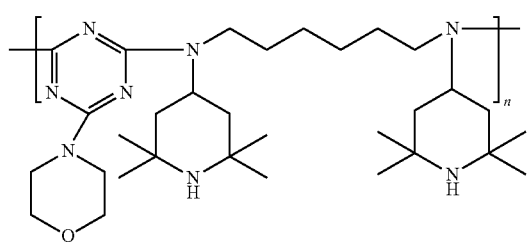

wherein n is preferably from 1 to 50. Such compound is known as Poly[(6-morpholino-s-triazine-2,4-diyl)[2,2,6,6-tetra-methyl-4-piperidyl)imino]-hexamethylene[(2,2,6,6 tetra-methyl-4-piperidyl)imino]];

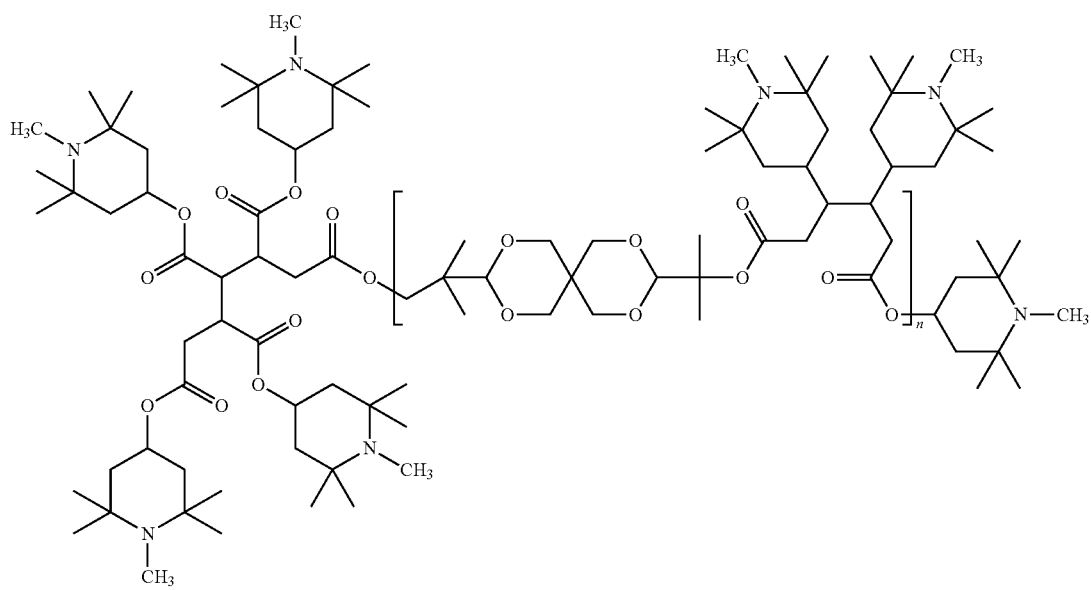

wherein n is preferably from 1 to 50. Such compound is known as 1,2,3,4-Butanetetracarboxylic acid, polymer with β, β, β', β'-tetramethyl-2,4,8,10-tetraoxaspiro[5.5]undecane-3,9-diethanol, 1,2,2,6,6-pentamethyl-4-piperidinyl ester;

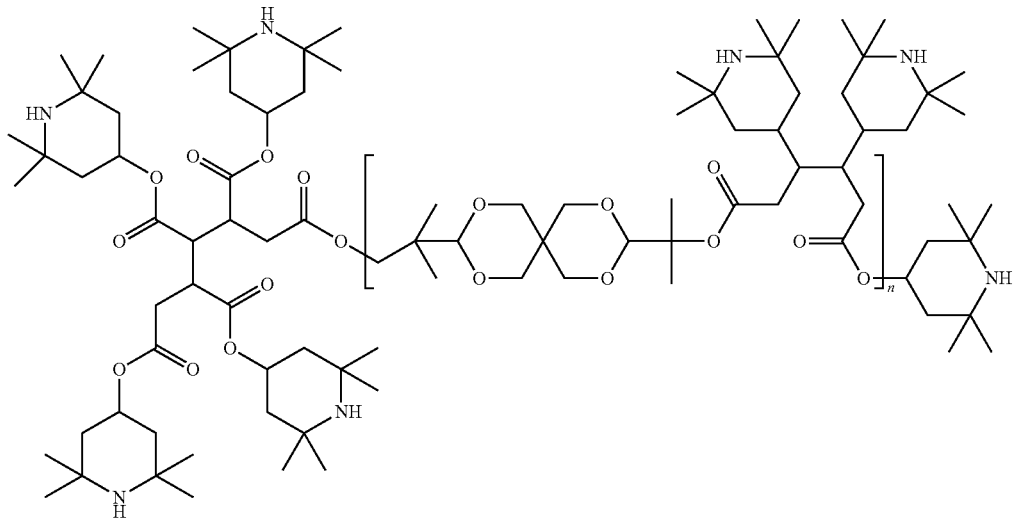

wherein n is preferably from 1 to 50. Such compound is known as 1,2,3,4-Butanetetracarboxylic acid, polymer with β, β, β, β'-tetramethyl-2,4,8,10-tetraoxaspiro [5.5]undecane-3,9-diethanol, 2,2,6,6-tetramethyl-4-piperidinyl ester;

Further suitable HAS compounds include:

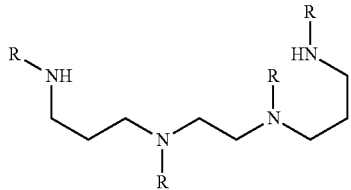

wherein

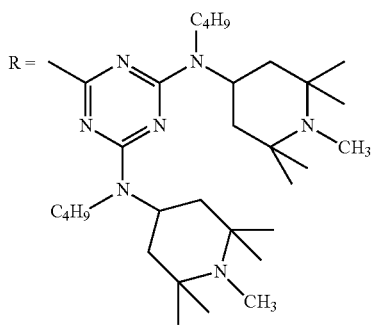

such compound being known as 1,3,5-Triazine-2,4,6-triamine, N,N'''-[1,2-ethanediylbis [[[4,6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl).

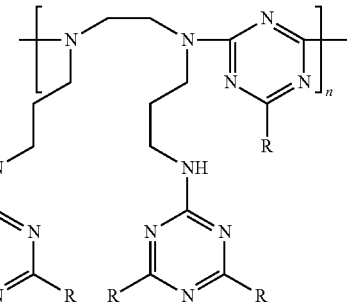

wherein

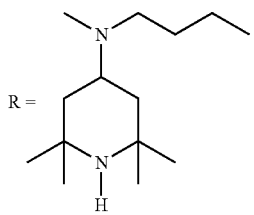

and wherein n is preferably from 1 to 50. Such compound is known as 1,3-Propanediamine, N,N-1,2-ethanediylbis-, polymer with 2,4,6-trichloro-1,3,5-triazine, reaction products with N-butyl-2,2,6,6-tetramethyl-4-piperidinamine;

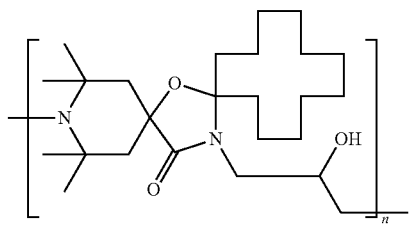

wherein n is preferably from 1 to 50. Such compound is known as 2,2,4,4-Tetramethyl-7-oxa-20-(oxiranylmethyl)-3,20-diazadispiro(5.1.11.2)henicosan-21-one;

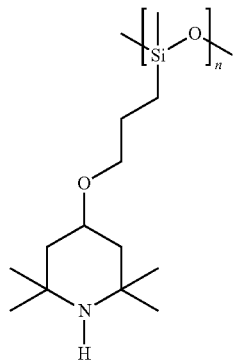

wherein n is preferably from 1 to 50. Such compound is known as poly[oxy[methyl[3-[(2,2,6,6-tetramethyl-4-piperidinyl)oxy]propyl]silylene]] Poly-methylpropyl-3-oxy[4(2,2,6,6-tetramethyl)-piperidinyl]-siloxane;

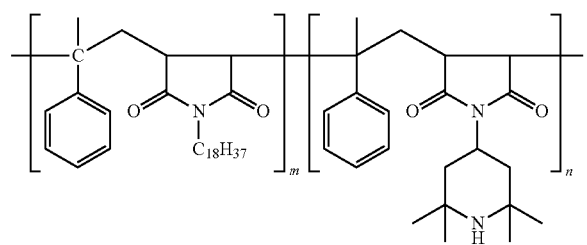

wherein both m and n are preferably from 1 to 50. Such compound is a copolymer of α-methyl-styrene and N-(2,2,6,6-tetra-methyl-piperidinyl)-4-maleimide and n-stearyl maleimide.

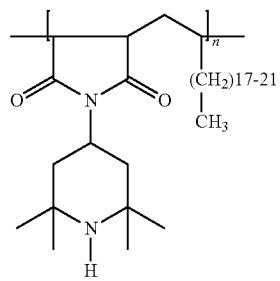

wherein n is preferably from 1 to 50.

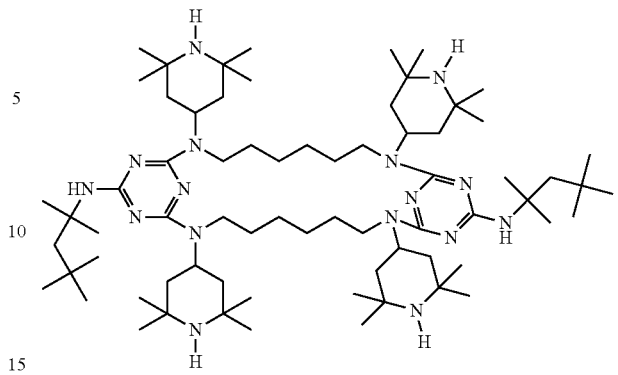

known as 2,9,11,13,15,22,24,26,27,28-Decaazatricyclo[21.3.1.110,14]octacosa-1(27),10,12,14(28),23,25-hexaene-12,25-diamine,N,N'-bis(1,1,3,3-tetramethylbutyl)-2,9,15,22-tetrakis(2,2,6,6-tetramethyl-4-piperidinyl).

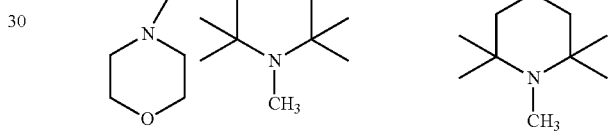

wherein n is preferably from 1 to 50. Such compound is known as poly[(6-morpholino-s-triazine-2,4-diyl)[1,2,2,6,6-penta-methyl-4-piperidyl)imino]-hexamethylene[(1,2,2,6,6 penta-methyl-4-piperidyl)imino]];

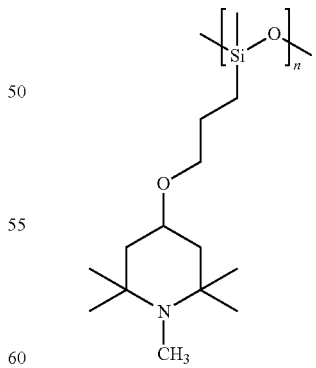

wherein n is preferably from 1 to 50. Such compound is known as poly-methoxypopyl-3-oxy[4(1,2,2,6,6-pentamethyl)-piperidinyl]-siloxane.

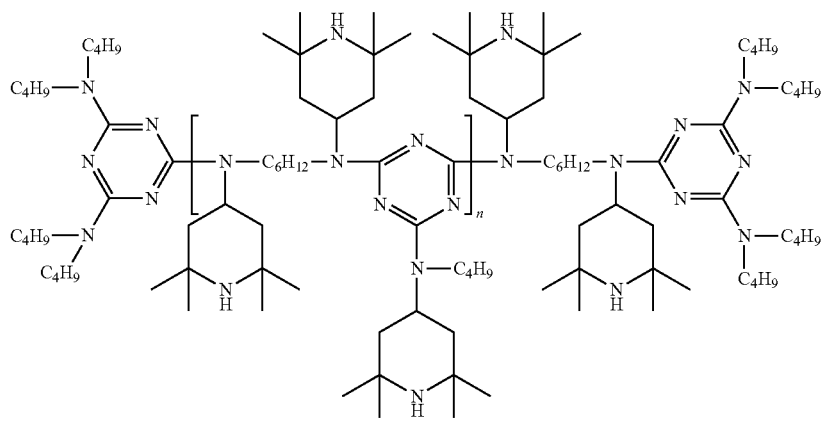

wherein n is preferably from 1 to 50. Such compound is known as 1,6-Hexanediamine, N, N'-bis(2,2,6,6-tetramethyl-4piperidinyl)-polymer with 2,4,6-trichloro-1,3,5-triazine, reaction products with N-butyl-1-butanamine and N-butyl-2,2,6,6-tetramethyl-4-piperidinamine.

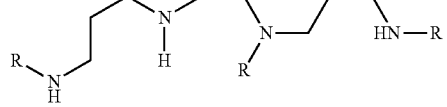

wherein

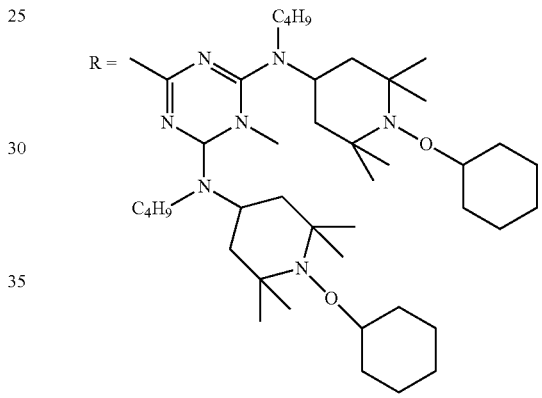

Such compounds may be reaction products of N, N'-ethane-1,2-diylbis (1,3-propanediamine), cyclohexane, peroxidized 4-butylamino-2,2,6,6-tetramethylpiperidine and 2,4,6-trichloro-1,3,5-triazine;

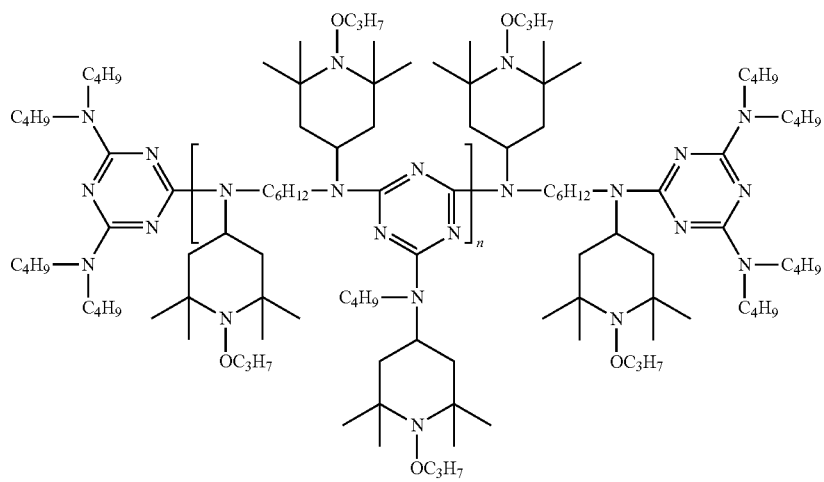

wherein n is preferably from 1 to 50. Such compound is known as 1,6-hexanediamine, N,N'-bis(2,2,6,6-tetramethyl-4-piperidinyl)-, polymer with 2,4,6-trichloro-1,3,5-triazine, reaction products with 3-bromo-1-propene, n-butyl-1-butan-amine and N-butyl-2,2,6,6-tetramethyl-4-piperidinamine, oxidised, hydrogenated.

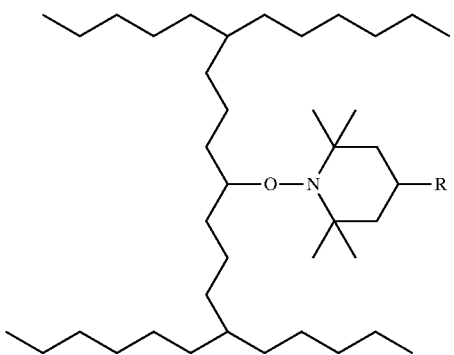

wherein R is a fatty acid.

Also preferred are HAS containing a group via which the HAS can be grafted to the PO. A suitable example thereof include 2-Butenedioic acid (E)-, bis(2,2,6,6-tetramethyl-4-piperidinyl) ester polymer with 1-propene:

Graft of

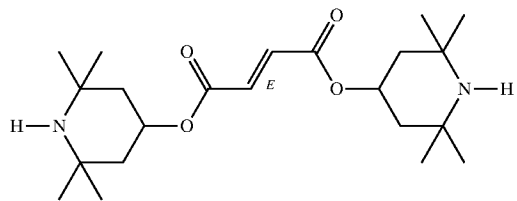 [SMILES: CC1(C)CC(OC(=O)/C=C/C(=O)OC2CC(C)(C)NC(C)(C)C2)CC(C)(C)N1]

on PP

Preferably HAS have a molecular weight of at least 450 g/mol, more preferably at least 1000 g/mol, more preferably at least 1250 g/mol, even more preferably at least 1500 g/mol.

Also the HAS known as Poly[[6-[(1,1,3,3-tetramethyl-butyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]) and having the formula:

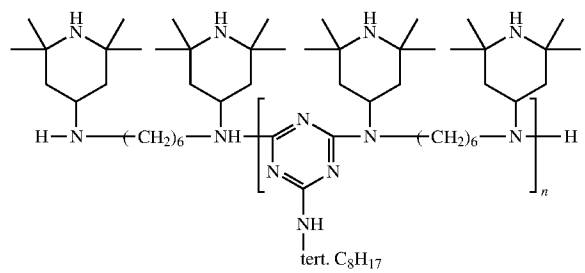

is preferred for utilization in accordance with the invention, the $M_n$ thereof being preferably between 2000 and 3100.

When the fibers of the invention are gel-spun fibers, the HAS used in accordance with the invention are preferably soluble in the solvent used for the UHMWPE, e.g. decalin.

Preferably the HAS has a solubility of at least 1 g/l of the solvent used in step a) at a temperature of 21° C., more preferably the stabilizer has a solubility of at least 10 g/l.

All of the above mentioned HAS may be used either alone or in a combination with each other.

A further type of stabilizers suitable for the present invention include phenolic stabilizers, concrete examples thereof including those mentioned in EP 0 343 863 A2 from page 5, line 4 to page 6, line 25; included herein by reference. One group of phenolic stabilizers is natural phenolic antioxidants including Vitamin E. Natural phenolic antioxidants and especially Vitamin E are highly preferred stabilizers particularly for medical applications. The phenolic stabilizers may be used either alone or in combination of two or more.

A further type of stabilizers suitable for the present invention include organic phosphite stabilizers, concrete examples thereof including those mentioned in EP 0 343 863 A2 from page 6, line 43 to page 7, line 34; included herein by reference. These organic phosphite stabilizers may be used either alone or in combination of two or more.

A further type of stabilizers suitable for the present invention include organic thioether stabilizers, concrete examples thereof including those mentioned in EP 0 343 863 A2 at page 7 from line 53 to line 58; included herein by reference. These organic thioether stabilizers may be used either alone or in combination of two or more.

Other suitable stabilizers for use in the present invention are those selected from the group consisting of hindered phenols, aromatic phosphites, amines and their mixture. Preferably, the stabilizer is selected from the group consisting of (2,6-di-tert-butyl-4-methyl-phenol, tetrakis[methylene(3,5-di-tert-butylhydroxyhydrocinnamate)]methane, tris (2,4-di-tert-butylphenyl) phosphite, octadecyl 3,5-di-tert-butyl-4-hydroxyhydrocinnamate, 1,3,5-tris(3,5-di-tert-butyl-4-hydroxybenzyl)-1,3,5-triazine-2,4,6(1H,3H,5H)-trione, 2,5,7,8-tetramethyl-2(4',8',12'-trimethyltridecyl) chroman-6-ol and their mixtures. More preferably the antioxidant is 2,5,7,8-tetramethyl-2(4',8',12'-trimethyltridecyl) chroman-6-ol commonly known as Vitamin E or α-tocopherol.

Preferably, the alkyl branches of the UHMWPE have a number of carbon atoms between 1 and 15, more preferably between 2 and 10, most preferably between 2 and 6. Good results were obtained when the branches were ethyl branches (C=2) or butyl branches (C=4).

Therefore in one embodiment, the invention provides a creep-optimized fiber obtained by spinning an UHMWPE comprising ethyl branches and having an intrinsic viscosity (IV) of at least 5 dl/g, an elongational stress (ES), and a ratio $$\left(\frac{C2H5/1000C}{ES}\right)$$

between the number of ethyl branches per thousand carbon atoms (C2H5/1000C) and the elongational stress (ES) of at least 0.5 mm²/N, preferably at least 1.0 mm²/N. Preferably, the fiber of this embodiment when pre-conditioned for 48 h at 100° C. and subjected to a load of 600 MPa at a temperature of 70° C., has a creep lifetime of at least 90 hours, preferably of at least 100 hours, more preferably of at least 110 hours, even more preferably of at least 120 hours, most preferably of at least 125 hours.

In a preferred embodiment, the fiber is obtained by spinning an UHMWPE comprising ethyl branches wherein the UHMWPE has an amount of ethyl branches per thousand carbon atoms (C2H5/1000C) of between 0.60 and 1.10.

In another embodiment, the invention provides a creep-optimized UHMWPE fiber obtained by spinning an UHMWPE comprising butyl branches and having an intrinsic viscosity (IV) of preferably at least 5 dl/g, an elongational stress (ES), and a ratio $$\left(\frac{C4H9/1000C}{ES}\right)$$

between the number of butyl branches per thousand carbon atoms (C4H9/1000C) and the elongational stress (ES) of at least 0.2 mm$^2$/N. Preferably, the fiber of this embodiment when pre-conditioned for 48 h at 100° C. and subjected to a load of 600 MPa at a temperature of 70° C., has a creep lifetime of at least 90 hours, preferably of at least 100 hours, more preferably of at least 110 hours, even more preferably of at least 120 hours, most preferably of at least 125 hours.

Preferably, the creep lifetime of the inventive UHMWPE fibers as described in the embodiments hereinabove, is at least 150 hours, more preferably at least 200 hours, even more preferably at least 250 hours, even more preferably at least 290 hours, yet even more preferably at least 350 hours, yet even more preferably at least 400 hours, most preferably at least 445 hours. Such good creep lifetimes were particularly obtained for the embodiments of fibers spun from UHMWPEs wherein the stabilizer was a hindered amine stabilizers (HAS) having a molecular weight of at least 500 g/mol. The creep lifetime is measured on multifilament yarns in accordance with the methodology described in the METHODS FOR MEASUREMENT section hereinbelow.

Preferably, the inventive UHMWPE fibers and in particular those spun from UHMWPEs having ethyl or butyl branches, have a tenacity of at least 25 cN/dtex, more preferably of at least 32 cN/dtex, most preferably of at least 38 cN/dtex. Preferably, the inventive UHMWPE fibers and in particular those spun from UHMWPEs having ethyl or butyl branches, have an elastic modulus of at least 1100 cN/dtex, more preferably of at least 1200 cN/dtex, most preferably of at least 1300 cN/dtex. It was observed that in addition to the excellent creep properties, the inventive UHMWPE fibers have also good tensile properties.

According to the invention, the inventive UHMWPE fibers are obtained by a gel spinning process. Therefore, the fibers of the invention are preferably obtained by gel-spinning an UHMWPE comprising ethyl branches or butyl branches and having a number of branches per thousand carbon atoms, an ES and an IV as described throughout the present document.

For the present invention, by gel-spinning process is meant a process comprising at least the steps of (a) preparing a solution comprising an UHMWPE and a suitable solvent for UHMWPE; (b) extruding said solution through a spinneret to obtain a gel fiber containing said UHMWPE and said solvent for UHMWPE; and (c) extracting the solvent from the gel fiber to obtain a solid fiber. The gel-spinning process may also optionally contain a drawing step wherein the gel fiber and/or the solid fiber are drawn with a certain draw ratio. Gel spinning processes are known in the art and are disclosed for example in WO 2005/066400; WO 2005/066401; WO 2009/043598; WO 2009/043597; WO 2008/131925; WO 2009/124762; EP 0205960 A, EP 0213208 A1, U.S. Pat. No. 4,413,110, EP 0200547 B1, EP 0472114 B1, WO 2001/73173 A1 and EP 1,699,954, these publications and the references cited therein being included herein by reference.

According to the invention, the gel-spinning process for manufacturing the inventive UHMWPE fibers, uses an UHMWPE polymer. By UHMWPE is herein understood a polyethylene having an intrinsic viscosity (IV) as measured on solution in decalin at 135° C., of preferably at least 5 dl/g. Preferably, the IV of the UHMWPE is at least 10 dl/g, more preferably at least 15 dl/g, even more preferably at least 19 dl/g, most preferably at least 21 dl/g. Preferably, the IV is at most 40 dl/g, more preferably at most 30 dl/g, even more preferably at most 25 dl/g.

The UHMWPE used in the present invention has preferably a ratio $$\frac{AB/1000C}{ES}$$

of at least 0.3 mm$^2$/N, more preferably of at least 0.4 mm$^2$/N, even more preferably of at least 0.5 mm$^2$/N, yet even more preferably of at least 0.7 mm$^2$/N, yet even more preferably of at least 1.0 mm$^2$/N, yet even more preferably of at least 1.2 mm$^2$/N. It was surprisingly observed that by increasing the above mentioned ratio, the properties of the inventive UHMWPE fibers may be improved.

When the UHMWPE used in the present invention has ethyl branches, said UHMWPE preferably has a ratio $$\frac{C2H5/1000C}{ES}$$

of at least 1.00 mm$^2$/N, more preferably of at least 1.30 mm$^2$/N, even more preferably of at least 1.45 mm$^2$/N, yet even more preferably of at least 1.50 mm$^2$/N, most preferably of at least 2.00 mm$^2$/N. Preferably said ratio is between 1.00 mm$^2$/N and 3.00 mm$^2$/N, more preferably between 1.20 mm$^2$/N and 2.80 mm$^2$/N, even more preferably between 1.40 mm$^2$/N and 1.60 mm$^2$/N, yet even more preferably between 1.45 mm$^2$/N and 2.20 mm$^2$/N.

When the UHMWPE used in the present invention has butyl branches, said UHMWPE preferably has a ratio $$\frac{C4H9/1000C}{ES}$$

of at least 0.25 mm$^2$/N, even more preferably at least 0.30 mm$^2$/N, yet even more preferably at least 0.40 mm$^2$/N, yet even more preferably at least 0.70 mm$^2$/N, more preferably of at least 1.00 mm$^2$/N, most preferably of at least 1.20 mm$^2$/N. Preferably said ratio is between 0.20 mm$^2$/N and 3.00 mm$^2$/N, more preferably between 0.40 mm$^2$/N and 2.00 mm$^2$/N, even more preferably between 1.40 mm$^2$/N and 1.80 mm$^2$/N.

The UHMWPE used in the present invention has preferably an ES of at most 0.70 N/mm$^2$, more preferably of at most 0.50 N/mm$^2$, more preferably of at most 0.49 N/mm$^2$, even more preferably at most 0.45 N/mm$^2$, most preferably at most 0.40 N/mm$^2$. When said UHMWPE has ethyl branches, preferably said UHMWPE has an ES of between 0.30 N/mm$^2$ and 0.70 N/mm$^2$, more preferably between 0.35 N/mm$^2$ and 0.50 N/mm$^2$. When said UHMWPE has butyl branches, preferably said UHMWPE has an ES of between 0.30 N/mm$^2$ and 0.50 N/mm$^2$, more preferably between 0.40 N/mm$^2$ and 0.45 N/mm$^2$.

The UHMWPE used according to the invention, also has preferably an amount of alkyl branches per thousand carbon atoms (AB/1000C) of between 0.05 and 1.30, more preferably between 0.10 and 1.10, even more preferably between 0.30 and 1.05.

When the UHMWPE used according to the invention has ethyl branches, preferably said UHMWPE has an amount of ethyl branches per thousand carbon atoms (C2H5/1000C) of between 0.40 and 1.10, more preferably between 0.60 and 1.10. In a first preferred embodiment, the C2H5/1000C is between 0.63 and 0.75, preferably between 0.64 and 0.72, more preferably between 0.65 and 0.70. For the first preferred embodiment, it was observed that the tensile properties of the inventive UHMWPE fibers were improved while also achieving a unique creep lifetime. In a second preferred embodiment, the C2H5/1000C is between 0.78 and 1.10, preferably between 0.90 and 1.08, more preferably between 1.02 and 1.07. For the second preferred embodiment it was observed that the creep lifetime of the inventive UHMWPE fibers was improved.

When the UHMWPE used according to the invention has butyl branches, preferably said UHMWPE has an amount of butyl branches per thousand carbon atoms (C4H9/1000C) of between 0.05 and 0.80, more preferably between 0.10 and 0.60, even more preferably between 0.15 and 0.55, most preferably between 0.30 and 0.55.

Preferably, any ones of the UHMWPEs used according to the invention are obtained by a slurry polymerisation process in the presence of an olefin polymerisation catalyst at a polymerisation temperature. The process for the manufacturing of the used UHMWPE is described in detail in WO2012139934, which is herewith included by reference.

According to the invention, a gel-spinning process is used to manufacture the inventive UHMWPE fibers, wherein as already mentioned hereinabove, the UHMWPE is used to produce an UHMWPE solution, which is subsequently spun through a spinneret and the obtained gel fiber is dried to form a solid fiber.

The UHMWPE solution is preferably prepared with a UHMWPE concentration of at least 3 mass-%, more preferably of at least 5 mass-%. Preferably, the concentration is between 3 and 15 mass-% for UHMWPE with IV in the range 15-25 dl/g.

To prepare the UHMWPE solution, any of the known solvents suitable for gel spinning the UHMWPE may be used. Such solvents are also referred to herein as "spinning solvents". Suitable examples of solvents include aliphatic and alicyclic hydrocarbons, e.g. octane, nonane, decane and paraffins, including isomers thereof; petroleum fractions; mineral oil; kerosene; aromatic hydrocarbons, e.g. toluene, xylene, and naphthalene, including hydrogenated derivatives thereof, e.g. decalin and tetralin; halogenated hydrocarbons, e.g. monochlorobenzene; and cycloalkanes or cycloalkenes, e.g. careen, fluorine, camphene, menthane, dipentene, naphthalene, acenaphtalene, methylcyclopentandien, tricyclodecane, 1,2,4,5-tetramethyl-1,4-cyclohexadiene, fluorenone, naphtindane, tetramethyl-p-benzodiquinone, ethylfuorene, fluoranthene and naphthenone. Also combinations of the above-enumerated solvents may be used for gel spinning of UHMWPE, the combination of solvents being also referred to for simplicity as solvent. In a preferred embodiment, the solvent of choice is not volatile at room temperature, e.g. paraffin oil. It was also found that the process of the invention is especially advantageous for relatively volatile solvents at room temperature, as for example decalin, tetralin and kerosene grades. In the most preferred embodiment the solvent of choice is decalin.

The UHMWPE solution is then formed into gel filaments by spinning said solution through a spinneret preferably containing multiple spinholes. By spinneret containing multiple spinholes is herein understood a spinneret containing preferably at least 100, yet even more preferably at least 300, most preferably at least 500 spinholes. Preferably, the spinning temperature is between 150° C. and 250° C., more preferably said temperature is chosen below the boiling point of the spinning solvent. If for example decaline is used as spinning solvent the spinning temperature is preferably at most 190° C.

The gel filaments formed by spinning the UHMWPE solution through the spinneret are extruded into an air gap, and then into a cooling zone from where they are picked-up on a first driven roller. Preferably, the gel filaments are stretched in the air gap. In the cooling zone, the gel filaments are cooled preferably in a gas flow and/or in a liquid bath.

Subsequently to forming the gel filaments, said gel filaments are subjected to a solvent extraction step wherein the spinning solvent used to manufacture the UHMWPE solution is at least partly removed from the gel filaments to form solid filaments. The solvent removal process may be performed by known methods, for example by evaporation when a relatively volatile spinning solvent, e.g. decaline, is used or by using an extraction liquid, e.g. when paraffin is used as spinning solvent, or by a combination of both methods. Preferably the gel filaments are drawn with a draw ratio of preferably at least 1.2, more preferably at least 1.5, most preferable at least 2.0.

Preferably, the solid filaments are also drawn during and/or after said removal of the solvent. Preferably, the drawing of the solid filaments is performed in at least one drawing step with a draw ratio of preferably at least 4, more preferably at least 7, even more preferably at least 10. More preferably, the drawing of solid filaments is performed in at least two steps, even more preferably in at least three steps.

The inventive UHMWPE fibres have properties which make them an interesting material for use in ropes, cordages and the like, preferably ropes designed for heavy-duty operations as for example marine, industrial and offshore operations. Rigging ropes and ropes used in sports applications such as yachting, climbing, kiteflying, parachuting and the like are also applications where the fibers of the invention may perform well. In particular it was observed that the inventive UHMWPE fibers are particularly useful for long-term and ultralong-term heavy-duty operations.

Heavy duty operations may further include, but not restricted to, crane ropes, ropes for deep-sea deployment or recovery of hardware, anchor handling, mooring of support platforms for offshore renewable energy generation, mooring of offshore oil drilling rigs and production platforms such as offshore production platforms and the like. It was surprisingly observed that for such operations, and in particular for offshore mooring, the installation of ropes designed therefor may be optimized, e.g. the ropes can be installed using less complex hardware or smaller and lighter installation equipment.

The inventive UHMWPE fibers are also very suitable for use as a reinforcing element, for example in a liner, for reinforced products such as hoses, pipes, pressurized vessels, electrical and optical cables, especially when said reinforced products are used in deepwater environments where reinforcement is required to support the load of the reinforced products when free hanging. The invention therefore also relates to a liner and a reinforced product containing reinforcing elements or containing said liner, wherein the reinforcing elements or the liner contain the inventive UHMWPE fibers.

Most preferably, the inventive UHMWPE fibres are used in applications where said fibres experience static tension or static loads and in particular long-term and ultralong-term static tension or static loads. By static tension is herein meant that the fibre in application always or most of the time is under tension irrespective if the tension is at constant level (for example a weight hanging freely in a rope comprising the fibre) or varying level (for example if exposed to thermal expansion or water wave motion). Examples of applications wherein static tensions are encountered are for example many medical applications (for example cables and sutures) but also mooring ropes, and tension reinforcement elements, as the improved creep lifetime of the present fibres leads to improved performances of these and similar applications. A particular application of the inventive UHMWPE fibers is in crane ropes where the rope can reach an elevated temperature as result of (1) ambient temperatures and/or (2) internal heat generation due to friction around crane sheaves.

Therefore, the invention relates to ropes and in particular mooring ropes, with or without a cover, containing the inventive UHMWPE fibres. Preferably, at least 50 mass-%, more preferably at least 75 mass-%, even more preferably at least 90 mass-% from the total mass of the fibres used to manufacture the rope and/or the cover consists of the inventive UHMWPE fibres. Most preferably the mass of fibers used to manufacture the rope and/or the cover consists of the inventive UHMWPE fibres. The remaining mass percentage of the fibres in the rope according to the invention, may contain fibres or combination of fibers made of other materials suitable for making fibres as for example metal, glass, carbon, nylon, polyester, aramid, other types of polyolefin and the like.

The invention further relates to composite articles containing the inventive UHMWPE fibres.

In a preferred embodiment, the composite article contains at least one mono-layer comprising the UHMWPE fibres of the invention. The term mono-layer refers to a layer of fibers, i.e. fibers in one plane. In a further preferred embodiment, the mono-layer is a unidirectional mono-layer. The term unidirectional mono-layer refers to a layer of unidirectionally oriented fibers, i.e. fibers in one plane that are essentially oriented in parallel. In a yet further preferred embodiment, the composite article is multi-layered composite article, containing a plurality of unidirectional mono-layers the direction of the fibres in each mono-layer preferably being rotated with a certain angle with respect to the direction of the fibres in an adjacent mono-layer. Preferably, the angle is at least 30°, more preferably at least 45°, even more preferably at least 75°, most preferably the angle is about 90°. Multi-layered composite articles proved very useful in ballistic applications, e.g. body armor, helmets, hard and flexible shield panels, panels for vehicle armouring and the like. Therefore, the invention also relates to ballistic-resistant articles as the ones enumerated hereinabove containing the UHMWPE fibres of the invention.

The inventive UHMWPE fibres of the invention are also suitable for use in medical devices, e.g. sutures, medical cables, implants, surgical repair products and the like. The invention therefore further relates to a medical device, in particular to a surgical repair product and more in particular to a suture and to a medical cable comprising the UHMWPE fibres of the invention.

It was also observed that the inventive UHMWPE fibres are also suitable for use in other applications like for example, synthetic chains, conveyor belts, tensiarity structures, concrete reinforcements, fishing lines and fishing nets, ground nets, cargo nets and curtains, kite lines, dental floss, tennis racquet strings, canvas (e.g. tent canvas), nonwoven cloths and other types of fabrics, webbings, battery separators, capacitors, pressure vessels (e.g. pressure cylinders, inflatables), hoses, (offshore) umbilical cables, electrical, optical fiber, and signal cables, automotive equipment, power transmission belts, building construction materials, cut and stab resistant and incision resistant articles, protective gloves, composite sports equipment such as skis, helmets, kayaks, canoes, bicycles and boat hulls and spars, speaker cones, high performance electrical insulation, radomes, sails, geo-textiles such as mats, bags and nets; and the like. Therefore, the invention also relates to the applications enumerated above containing the UHMWPE fibers of the invention.

The invention also relates to an elongated object comprising a plurality of the UHMWPE fibers of the invention, wherein said fibers are at least partly fused to each other. In one embodiment said elongated object is a monofilament. In a different embodiment, said elongated object is a tape. By at least partly fused fibers is herein understood that individual fibers are fused at multiple locations along their length and disconnected between said locations. Preferably, said fibers are fully fused to each other, i.e. the individual fibers are fused to each other over essentially their whole length. Preferably, the fusing is carried out by at least compressing said plurality of UHMWPE fibers under a temperature lower than the melting temperature of the fibers. The melting temperature of the fibers can be determined by DSC using a methodology as described at pg. 13 of WO 2009/056286. Processes of fusing UHMWPE fibers into monofilaments and tapes are known in the art and disclosed for example in WO 2004/033774; WO 2006/040190; and WO 2009/056286. It was observed that by using the fibers of the invention, monofilaments and tapes having optimized creep properties were achieved. Such products were suitable for utilisation in applications such as fishing lines; liners; reinforcing elements; antiballistic articles such as armours; car parts; and architectural applications such as doors.

The invention will be further explained by the following examples and comparative experiment, however first the methods used in determining the various parameters used hereinabove are presented.

Methods of Measurement:

IV: the Intrinsic Viscosity for UHMWPE is determined according to ASTM D1601-99(2004) at 135° C. in decalin, with a dissolution time of 16 hours, with BHT (Butylated Hydroxy Toluene) as anti-oxidant in an amount of 2 g/l solution. IV is obtained by extrapolating the viscosity as measured at different concentrations to zero concentration.

dtex: fibers' titer (dtex) was measured by weighing 100 meters of fiber. The dtex of the fiber was calculated by dividing the weight in milligrams to 10;

Tensile properties of fibers: tensile strength (or strength) and tensile modulus (or modulus) and elongation at break are defined and determined on multifilament yarns as specified in ASTM D885M, using a nominal gauge length of the fibre of 500 mm, a crosshead speed of 50%/min and Instron 2714 clamps, of type "Fibre Grip D5618C". On the basis of the measured stress-strain curve the modulus is determined as the gradient between 0.3 and 1% strain. For calculation of the modulus and strength, the tensile forces measured are divided by the titre, as determined by weighing 10 metres of fibre; values in GPa are calculated assuming a density of 0.97 g/cm$^3$.

The amount of stabilizer in the fiber was determined by the well-established FT-IR spectroscopy. A powder sample of the polymer used to manufacture the fiber therefrom was used to press a film (typically 600 microns thickness) and its IR spectrum was recorded. Subsequently, the IR spectrum of films (having the same thickness as the above) pressed from the above mentioned powder and also containing known amounts of stabilizers (typically 0.05 wt %, 0.1 wt % and 0.15 wt %) were also recorded. The film samples of the above were compared to determine the peaks given by the presence of the stabilizer. From these the intensities of the highest peak (at a representative wavelength) of the stabilizer in the samples containing thereof were represented versus the concentration of the stabilizer and the data was linearly fitted to obtain as so-called calibration line. Normalization can also be carried out to ensure for a higher accuracy, e.g. in case films having different thicknesses are analyzed. For this normalization the most intense peaks adjacent on both sides to the highest peak (at the representative wavelength) can be used. Subsequently, a film having the same thickness as the above was pressed from the polymeric fibers containing the stabilizer in the amount to be determined. Such film is hereinafter referred to as fibrous-film. The IR spectrum of the fibrous-films was determined and the height of the peak given by the stabilizer recorded at the representative wavelength was compared with the calibration line. From the calibration line the amount of stabilizer was determined. Care was taken throughout the procedure to compress under the same temperature and pressure conditions films having the same thickness. Alternatively, for comparing the IR spectrum of films having different thicknesses, normalization to the peak corresponding to a polymer specific vibration can be carried out. The skilled person in the art of FT-IR is aware of such procedure as the peaks corresponding to polymer specific vibrations can be found in standard FT-IR textbooks. Typically, this is the peak of the polymer which is the least sensitive to e.g. crystallization effects and other different physical properties of the polymer, e.g. molecular weight, branches, etc. In case combination of stabilizers are used in the fiber, the above detailed calibration procedure is applied to obtain calibration lines for each of the specific stabilizers, and afterwards from the ratios of the peaks at certain concentration and that of the used concentrations, the data can be routinely extrapolated to obtain at least the total amount of the combination of stabilizers in the fiber.

As an example of the above, the amount of Chimassorb 944 in a UHMWPE fiber has been determined as follows: an amount of fibers was pressed with a pressure of 20 MPa at a temperature of 200° C.; the amount being chosen to yield a 600 micron thick film. A transmission spectrum of the film was recorded, followed by normalization. For normalization the 2018 cm$^{-1}$ peak was used (reference; Braco at all, Polymer 46 (2005); 10645-10657); The peak intensity between 1980 cm$^{-1}$ and 2100 cm$^{-1}$ was normalized to 0.5 with a zero point at 1980 cm$^{-1}$. The peak height at 1530 cm$^{-1}$ was used for calculation, using the peaks at 1545 cm$^{-1}$ and 1518 cm$^{-1}$ as baseline points. The stabilizer concentration was calculated from the peak height using a calibration line. The calibration line was calculated from linear regression of the peak heights at 1530 cm$^{-1}$ of four pressed UHMWPE powder samples (same as the one used to manufacture the fiber), which contain 0 wt %; 0.05 wt %; 0.1 wt % and 0.15 wt. % of Chimassorb 944, respectively. The calibration samples have been prepared by blending the UHMWPE powder with a solution of the Chimassorb 944 in acetone; whereby the solution to powder ratio was at least 1:10. After evaporation of the acetone, the UHMWPE powders with different Chimassorb 944 concentrations were consolidated under a pressure of 20 MPa at a temperature of 200° C. and 600 micron films were obtained using a microtome.

Here also further examples of peaks that can be used to determine the amount of stabilizers such as e.g. Tinuvin® 765 and 770, may be determined using the peaks at 1728 cm$^{-1}$ and using the peaks at 1750 cm$^{-1}$ and 1710 cm$^{-1}$ as baseline points for normalization.

Number of alkyl, e.g. ethyl or butyl, branches per thousand carbon atoms: was determined by FTIR on a 2 mm thick compression moulded film by quantifying the absorption at 1375 cm$^{-1}$ using a calibration curve based on NMR measurements as in e.g. EP 0 269 151 (in particular pg. 4 thereof).

Elongational stress (ES in N/mm$^2$) of an UHMWPE, is measured according to ISO 11542-2A.

Creep lifetime (CLT) and elongation during the creep lifetime were determined in accordance with the methodology described in the paper "*Predicting the Creep Lifetime of HMPE Mooring Rope Applications*" by M. P. Vlasblom and R. L. M. Bosman—Proceedings of the MTS/IEEE OCEANS 2006 Boston Conference and Exhibition, held in Boston, Massachusetts on Sep. 15-21, 2006, Session Ropes and tension Members (Wed 1:15 PM-3:00 PM). More in particular the creep lifetime may be determined with a device as schematically represented in FIG. 1, on untwined yarn samples, i.e. yarn with substantially parallel filaments, of about 1500 mm length, having a titer of about 504 dtex and consisting of 900 filaments. In case fibers having a tape-like shape need to be investigated, fibers having a width of about 2 mm were used. The yarn samples were slip-free clamped between two clamps (101) and (102) by winding each of the yarn's ends several times around the axes of the clamps and then knotting the free ends of the yarn to the yarn's body. The final length of the yarn between the clamps (200) was about 180 mm. The clamped yarn sample was placed in a temperature-controlled chamber (500) at a temperature of 70° C. by attaching one of the clamps to the ceiling of the chamber (501) and the other clamp to a counterweight (300) of 3187 g resulting in a load of 600 MPa on the yarn. The position of the clamp (101) and that of clamp (102) can be read on the scale (600) marked off in centimeters and with subdivisions in mm with the help of the indicators (1011) and (1021). Special care was taken when placing the yarn inside said chamber to ensure that the segment of the yarn between the clamps does not touch any components of the device, so that the experiment can run fully friction free. An elevator (400) underneath the counterweight was used to raise the counterweight to an initial position whereat no slackening of the yarn occurs and no initial load is applied to the yarn. The initial position of the counterweight is the position wherein the length of the yarn (200) equals the distance between (101) and (102) as measured on (600). The yarn was subsequently preloaded with the full load of 600 MPa during 10 seconds by lowering the elevator, after which the load was removed by raising again the elevator to the initial position. The yarn was subsequently allowed to relax for a period of 10 times the preloading time, i.e. 100 seconds. After the preloading sequence, the full load was applied again. The elongation of the yarn in time was followed on the scale (600) by reading the position of the indicator (1021). The time needed for said indicator to advance 1 mm was recorded for each elongation of 1 mm until the yarn broke.

The elongation of the yarn $\varepsilon_i$ [in mm] at a certain time t is herein understood the difference between the length of the yarn between the clamps at that time t, i.e. L(t), and the initial length (200) of the yarn $L_0$ between the clamps. Therefore:

$$\varepsilon_i(t)[\text{in mm}] = L(t) - L_0$$

The elongation of the yarn [in percentages] is:

$$\varepsilon_i(t)[\text{in \%}] = \frac{L(t) - L_0}{L_0} \times 100$$

Figure 2:
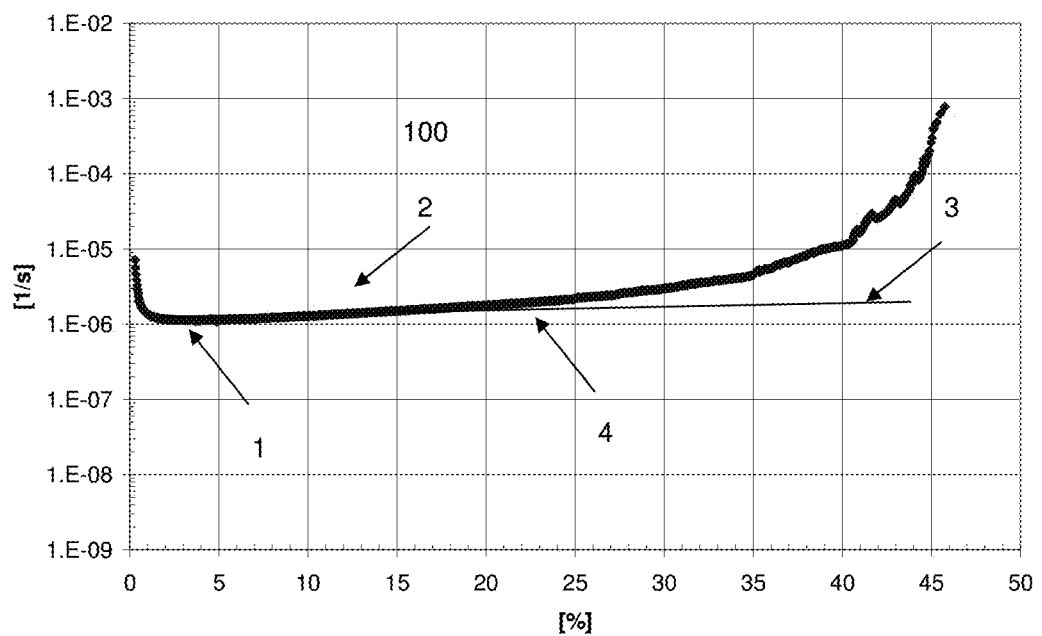
FIG. 2 shows a plot of the creep rate [1/s] on a logarithmic scale vs. the elongation in percentage [%] characteristic to an investigated yarn.

The creep rate [in 1/s] is defined as the change in yarn's length per time step and was determined according to Formula (2) as:

$$\dot{\varepsilon}_i = \frac{\varepsilon_i - \varepsilon_{i-1}}{t_i - t_{i-1}} \times \frac{1}{100} \quad (2)$$

wherein $\varepsilon_i$ and $\varepsilon_{i-1}$ are the elongations [in %] at moment i and at the previous moment i−1; and $t_i$ and $t_{i-1}$ are the time (in seconds) needed for the yarn to reach the elongations $\varepsilon_i$ and $\varepsilon_{i-1}$, respectively. The creep rate [1/s] was then plotted on a logarithmic scale vs. the elongation in percentage [%] to yield a plot (100) as for example shown in FIG. 2. The minimum (1) of the plot in FIG. 2 was then determined and the linear portion (2) thereof after said minimum (1) was fitted with a straight line (3) which contained also the minimum (1) of the plot. The elongation (4) where the plot (100) begins to deviate from the straight line was used to determine the time at which that elongation occurred. This time was considered as the creep lifetime for the yarn under investigation. Said elongation (4) was considered as the elongation during the creep lifetime.

Creep properties of Comparative Examples B and C have been measured at a load of 300 MPa. Such lower load was required to obtain measurable creep lifetime. The lower load was achieved by adjusting the weight of the attached counterweight (300) while considering the titer of the yarns of Comparative Examples B and C.

Preparation of UHMWPE
UHMWPE a)
A batch of ethyl branched UHMWPE was made according to the preparation described in WO2012139934 under Grade a). The polymerization conditions were accurately followed, however, only 2.5 ml (0.5 mol/L) of TEOS was used. THE UHMWPE produced according to this process had an ES of 0.49 N/mm$^2$ and a level of ethylene branches per 1000C of 0.69. The IV of the polymer was 20.5 dL/g.

Preparation of UHMWPE Fibers
UHMWPE fibers were produced according to the process described in WO2012139934 with and without the stabilizers. The stabilizers, if present, were solved together with the UHMWPE in the decalin.

The following 3 stabilizers were evaluated: Chimassorb®944 (Poly{[[6-[(1,1,3,3-tetramethylbutyl)amino]-s-triazine-2,4-diyl][(2,2,6,6-tetramethyl-4-piperidinyl)imino] hexamethylene [(2,2,6,6-tetramethyl-4-piperidinyl) imino]]}), Tinuvin®765 (Bis(1,2,2,6,6-pentamethyl-4-piperidyl)sebacate) and Tinuvin®770 (Bis(2,2,6,6-tetramethyl-4-piperidyl)sebacate). These stabilizers were supplied by BASF.

Pre-Conditioning of UHMWPE Fibers
Potential residues of decalin have been removed by pre-conditioning all the fibers prior to subjecting the fibers to the creep evaluation. Said pre-conditioning consisted in subjecting the fibers during 48 hours to a temperature of 100° C. in an air venting oven.

Example 1, 2 and 3

From the prepared UHMWPE a) yarns 1, 2 and 3 were spun each comprising 0.6 wt % of stabilizer. The obtained fibers have been pre-conditioned and subjected to a creep performance test at 70° C. under a load of 600 MPa. The creep performance data are reported in table 1 below.

Comparative Example A

This example reproduces a yarn according to WO2012139934 by spinning UHMWPE a) without the addition of a stabilizer. The obtained yarn A has been pre-conditioned and subject to a creep performance test. The properties of the yarn as well as its creep performance data are reported in table 1 below.

Comparative Example B and C have been produced from a UHMWPE sample with an ES of 0.44 N/mm$^2$ and 0.05 methyl groups/1000C, each a stabilizer free and a stabilized yarn was produced (Comparative Examples B and C respectively). The obtained fibers have been pre-conditioned and subjected to a creep performance test (at 70° C. under a load of 300 MPa). The properties of the yarn as well as its creep life time (CLT) are reported in table 1 below.

TABLE 1

| Sample | ES [N/mm$^2$] | Branching [/1000 C.] | Stabilizer [wt %] | Stabilizer type | CLT [h] 600 MPa | CLT [h] 300 MPa |
|---|---|---|---|---|---|---|
| Example 1 | 0.49 | 0.69 (Et) | 0.6 | Chimassorb ® 944 | 131 | |
| Example 2 | 0.49 | 0.69 (Et) | 0.6 | Tinuvin ® 765 | 111 | |
| Example 3 | 0.49 | 0.69 (Et) | 0.6 | Tinuvin ® 770 | 98 | |

TABLE 1-continued

| Sample | ES [N/mm²] | Branching [/1000 C.] | Stabilizer [wt %] | Stabilizer type | CLT [h] 600 MPa | CLT [h] 300 MPa |
|---|---|---|---|---|---|---|
| Comp Exp. A | 0.49 | 0.69 (Et) | — | | 47 | |
| Comp Exp. B | 0.44 | 0.05 (Me) | — | | | 117 |
| Comp Exp. C | 0.44 | 0.05 (Me) | 0.6 | Chimassorb ® 944 | | 100 |

The invention claimed is:

1. A gel-spinning method for forming a creep optimized gel-spun fiber comprising:
   (a) preparing a spinning composition comprised of an ultrahigh molecular weight polyethylene (UHMWPE) comprising alkyl branches (AB) and having an elongational stress (ES), and a ratio $$\left(\frac{AB/1000C}{ES}\right)$$

of at least 0.2 mm²/N in a solvent suitable for gel-spinning the UHMWPE;
   (b) providing a stabilizer which comprises a hindered amine stabilizer (HAS) having a molecular weight of at least 500 g/mol;
   (c) extruding the spinning composition through a spinneret to form a UHMWPE gel-fiber;
   (d) removing the solvent from the gel-fiber of step (c) to obtain a solid gel-spun UHMWPE fiber having a creep lifetime of at least 100 hours after being pre-conditioned for 48 h at 100° C. and subjected to a load of 600 MPa at a temperature of 70° C., and
   (e) prior to step (d), adding the stabilizer such that the stabilizer is present inside the solid gel-spun UHMWPE fiber in an amount between 0.05 and 10 parts by weight, based on 100 parts by weight of the UHMWPE forming the solid gel-spun UHMWPE fiber.

2. The method according to claim 1, wherein step (e) is practiced during step (a).

3. The method according to claim 2, wherein step (e) is practiced by adding the stabilizer to the spinning composition prepared according to step (a).

4. The method according to claim 1, wherein the solvent is decalin or paraffin.

5. The method according to claim 1, wherein the stabilizer comprises at least one HAS selected from the group consisting of poly{[[6-[(1,1,3,3-tetramethylbutyl)amino]-s-triazine-2,4-diyl][(2,2,6,6-tetramethyl-4-piperidinyl)imino] hexamethylene [(2,2,6,6-tetramethyl-4-piperidinyl) imino]]}),and (bis(1,2,2,6,6-pentamethyl-4-piperidyl)sebacate).

6. The method according to claim 1, wherein the UHMWPE comprises ethyl branches and has an intrinsic viscosity (IV) of at least 5 dl/g, an elongational stress (ES), and a ratio $$\left(\frac{C2H5/1000C}{ES}\right)$$

of at least 0.5 mm²/N.

7. The method according to claim 6, wherein the UHMWPE has an amount of ethyl branches per thousand carbon atoms (C2H5/1000C) of between 0.60 and 1.10.

8. The method according to claim 1, wherein the UHMWPE comprises butyl branches and has an intrinsic viscosity (IV) of at least 5 dl/g, an elongational stress (ES), and a ratio $$\left(\frac{C4H9/1000C}{ES}\right)$$

of at least 0.2 mm²/N.

9. The method according to claim 1, wherein the UHMWPE has an intrinsic viscosity (IV) which is at least 15 dl/g.

10. The method according to claim 1, wherein the UHMWPE has an elongational stress (ES) of at most 0.50 N/mm².

11. The method according to claim 1, further comprising the step of:
   (f) drawing the solid fibers during and/or after step (d).

12. The method according to claim 1, wherein step (c) is practiced at a spinning temperature of between 150° to 250° C.

13. The method according to claim 12, wherein the spinning temperature is below a boiling point of the solvent.

14. The method according to claim 1, wherein step (d) is practiced by:
   (d1) extruding the spun gel-fiber into an air gap, and then
   (d2) directing the gel-fiber into a cooling zone.

15. The method according to claim 14, which comprises stretching the gel-fiber in the air gap.

16. The method according to claim 1, wherein
   the hindered amine stabilizer (HAS) is poly{[[6-[(1,1,3,3-tetramethylbutyl) amino]-s-triazine-2,4-diyl][(2,2,6,6-tetramethyl-4-piperidinyl)imino]hexamethylene [(2,2,6,6-tetramethyl-4-piperidinyl) imino]]} or bis(1,2,2,6,6-pentamethyl-4-piperidyl)sebacate), and wherein
   the solid gel-spun UHMWPE fiber has a creep lifetime of at least 110 hours.

17. The method according to claim 1, wherein the fiber has a creep lifetime of at least 110 hours.

18. The method of claim 1, wherein the stabilizer is a hindered amine stabilizer (HAS) selected from the group consisting of:
   (a) poly{[[6-[(1,1,3,3-tetramethylbutyl)amino]-s-triazine-2,4-diyl][(2,2,6,6-tetramethyl-4-piperidinyl)imino] hexamethylene [(2,2,6,6-tetramethyl-4-piperidinyl) imino]]});
   (b) bis(1,2,2,6,6-pentamethyl-4-piperidyl)sebacate;
   (c) poly[[(2,2,6,6-tetramethyl-4-piperidinyl)imino]-1,2-ethanediyl[(2,2,6,6-tetramethyl-4-piperidinyl)imino]-1,6-hexanediyl;
   (d) poly[(6-morpholino-s-triazine-2,4-diyl)[2,2,6,6-tetramethyl-4-piperidyl)imino]-hexamethylene[(2,2,6,6 tetra-methyl-4-piperidyl)imino]];
   (e) dimethyl succinate polymer with 4-hydroxy-2,2,6,6-tetramethyl-1-piperidine ethanol;

(f) 1,3,5-triazine-2,4,6-triamine, N,N'''-[1,2-ethanediylbis [[[4,6-bis[butyl(1,2,2,6,6-pentamethyl-4-piperidinyl) amino]-1,3,5-triazine-2-yl]imino]-3,1-propanediyl]]-bis[N',N''-dibutyl-N',NΔ-bis(1,2,2,6,6-pentamethyl-4-piperidinyl);

(g) 1,3-propanediamine, N,N-1,2-ethanediylbis-,polymer with 2,4,6-trichloro-1,3,5-triazine, reaction products with N-butyl-2,2,6,6-tetramethyl-4-piperidinamine;

(h) 2,9,11,13,15,22,24,26,27,28-decaazatricyclo [21.3.1.110,14]octacosa-1(27),10,12,14(28),23,25-hexaene-12,25-diamine,N,N'-bis(1,1,3,3-tetramethylbutyl)-2,9,15,22-tetrakis(2,2,6,6-tetramethyl-4-piperidinyl);

(i) poly[(6-morpholino- s-triazine-2,4-diyl)[1,2,2,6,6-penta-methyl-4-piperidyl)imino]-hexamethylene[(1,2,2,6,6 penta-methyl-4-piperidyl)imino]];

(j) 1,6-Hexanediamine,N, N'-bis(2,2,6,6-tetramethyl-4piperidinyl)-polymer with 2,4,6-trichloro-1,3,5-triazine, reaction products with N-butyl-1-butanamine and N-butyl-2,2,6,6-tetramethyl-4-piperidinamine;

(k) reaction products of N, N'-ethane-1,2-diylbis (1,3-propanediamine), cyclohexane, peroxidized 4-butylamino-2,2,6,6-tetramethylpiperidine and 2,4,6-trichloro-1,3,5-triazine;

(l) 1,6-hexanediamine,N,N'-bis(2,2,6,6-tetramethyl -4-piperidinyl)-, polymer with 2,4,6-trichloro-1,3,5-triazine, reaction products with 3-bromo-1-propene, n-butyl-1-butanamine and N-butyl-2,2,6,6-tetramethyl-4-piperidinamine, oxidised, hydrogenated;

(m) poly[[6-[[(1,1,3,3-tetramethylbutyl)amino]-1,3,5-triazine-2,4-diyl][(2,2,6,6-tetramethyl-4-piperidinyl) imino]-1,6-hexanediyl[(2,2,6,6-tetramethyl-4-piperidinyl)imino]]), and combinations thereof.

19. The method according to claim 1, wherein the hindered amine stabilizer (HAS) has a molecular weight of at least 1000 g/mol.

20. The method according to claim 1, wherein the alkyl branches are methyl branches, ethyl branches or butyl branches.

21. The method according to claim 6, wherein the ratio $$\frac{C2H5/1000C}{ES}$$

is between 1.20 and 2.80 mm$^2$/N.

22. The method according to claim 6, wherein the ratio $$\frac{C2H5/1000C}{ES}$$

is between 1.40 and 1.60 mm$^2$/N.

23. The method according to claim 8, wherein the UHMWPE has an amount of butyl branches per thousand carbon atoms (C4H9/1000C) of between 0.10 and 0.60.

24. The method according to claim 8, wherein the ratio $$\left(\frac{C4H9/1000C}{ES}\right)$$

is between 0.40 and 2.00 mm$^2$/N.

25. The method according to claim 8, wherein the ratio $$\left(\frac{C4H9/1000C}{ES}\right)$$

is between 1.40 and 1.80 mm$^2$/N.

26. The method according to claim 1, wherein the UHMWPE has an intrinsic viscosity (IV) which is at least 19 dl/g.

27. The method of claim 1, wherein the amount of the stabilizer is between 0.05 and 5 parts by weight based on 100 parts by weight of the UHMWPE forming the solid gel-spun UHMWPE fiber.

28. The method according to claim 1, wherein the amount of the stabilizer is between 0.1 and 3 parts by weight based on 100 parts by weight of the UHMWPE forming the solid gel-spun UHMWPE fiber.

29. The method of claim 1, wherein the amount of the stabilizer is between 0.05 and 1 parts by weight based on 100 parts by weight of the amount of the polyethylene polymer forming the fiber body.

30. The method according to claim 1, wherein the UHMWPE has an elongational stress (ES) of between 0.35 and 0.50 N/mm$^2$.

* * * * *